United States Patent
Chen et al.

(10) Patent No.: US 11,792,494 B1
(45) Date of Patent: Oct. 17, 2023

(54) PROCESSING METHOD AND APPARATUS, ELECTRONIC DEVICE AND MEDIUM

(71) Applicant: LEMON INC., Grand Cayman (KY)

(72) Inventors: Guang Chen, Los Angeles, CA (US);
Longyin Wen, Los Angeles, CA (US);
Yufei Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/816,968

(22) Filed: Aug. 2, 2022

(30) Foreign Application Priority Data

Apr. 7, 2022 (CN) .......................... 202210363989.7

(51) Int. Cl.
*H04N 21/8405* (2011.01)
*H04N 21/8549* (2011.01)
(52) U.S. Cl.
CPC ..... *H04N 21/8405* (2013.01); *H04N 21/8549* (2013.01)
(58) Field of Classification Search
CPC .......................... H04N 21/8405; H04N 21/8549
See application file for complete search history.

(56) References Cited

U.S. PATENT DOCUMENTS

2020/0021873 A1* 1/2020 Swaminathan .......... G06N 3/08
2020/0336802 A1* 10/2020 Russell .................. G06N 20/00

FOREIGN PATENT DOCUMENTS

| CN | 101395607 A | 3/2009 |
|---|---|---|
| CN | 103473220 A | 12/2013 |
| CN | 111581926 A | 8/2020 |
| CN | 112163560 A | 1/2021 |
| CN | 113392687 A | 9/2021 |
| CN | 113569091 A | 10/2021 |

OTHER PUBLICATIONS

Search Report dated Mar. 16, 2023 for Chinese Application No. 202210363989.7, with English translation (8 pages).
Office Action dated Mar. 18, 2023 for Chinese Application No. 202210363989.7, with English translation (13 pages).
Supplementary Search Report dated Aug. 2, 2023 for Chinese Application No. 202210363989.7, with English translation (5 pages).
Office Action dated Aug. 9, 2023 for Chinese Application No. 202210363989.7, with English translation (12 pages).

\* cited by examiner

*Primary Examiner* — Nicholas T Corbo
(74) *Attorney, Agent, or Firm* — Faegre Drinker Biddle & Reath LLP

(57) ABSTRACT

Provided are a processing method and apparatus, an electronic device and a medium. The method includes steps described below. A target video is acquired; video information of the target video is determined; copy information corresponding to the video information is generated by using a video description model, where the copy information is generated by using the video description model and based on a task prompt and a copy keyword. Through this method, the video description model is constrained based on the task prompt and the copy keyword, so that the copy information of the target video is generated more accurately, and the coupling degree between the copy information and the target video is improved.

20 Claims, 4 Drawing Sheets

PROCESSING METHOD AND APPARATUS, ELECTRONIC DEVICE AND MEDIUM

CROSS-REFERENCE TO RELATED APPLICATION(S)

This application claims priority to Chinese Patent Application No. 202210363989.7 filed Apr. 7, 2022, the disclosure of which is incorporated herein by reference in its entirety.

TECHNICAL FIELD

Embodiments of the present disclosure relate to the field of computer technologies, in particular, a processing method and apparatus, an electronic device and a medium.

BACKGROUND

As computer technologies develop, more and more multimedia platforms emerge. Users can browse multimedia contents, such as videos, through the multimedia platforms.

Videos presented by existing multimedia platforms are mostly videos shot and edited by publishers, and the copy information displayed in a video is mostly text and stickers added by a user when editing the video or subtitle information corresponding to audio in the video. As a result, most of the existing copy information relies on user-defined descriptions and cannot accurately express the real meaning of the video.

SUMMARY

Embodiments of the present disclosure provide a processing method and apparatus, an electronic device and a medium, so that the copy information of a target video can be determined more accurately.

In a first aspect, an embodiment of the present disclosure provides a processing method. The processing method includes steps described below.

A target video is acquired.

Video information of the target video is determined.

Copy information corresponding to the video information is generated by using a video description model, where the video description model generates the copy information based on a task prompt and a copy keyword.

In a second aspect, an embodiment of the present disclosure further provides a processing apparatus. The processing apparatus includes a video acquisition module, an information determination module and an information generation module.

The video acquisition module is configured to acquire a target video.

The information determination module is configured to determine video information of the target video.

The information generation module is configured to generate copy information corresponding to the video information by using a video description model, where the video description model generates the copy information based on a task prompt and a copy keyword.

In a third aspect, an embodiment of the present disclosure provides an electronic device. The electronic device includes one or more processors and a storage apparatus configured to store one or more programs.

The one or more programs, when executed by the one or more processors, cause the one or more processors to implement the processing method of the embodiment of the present disclosure.

In a fourth aspect, an embodiment of the present disclosure further provides a computer-readable storage medium storing a computer program which, when executed by a processor, implements the processing method of the embodiment of the present disclosure.

The embodiments of the present disclosure provide a processing method and apparatus, an electronic device and a medium. The method includes steps described below. A target video is acquired; video information of the target video is determined; copy information corresponding to the video information is generated by using a video description model, where the video description model generates the copy information based on a task prompt and a copy keyword. Through the preceding technical solutions, the video description model is constrained based on the task prompt and the copy keyword, so that the copy information of the target video is generated more accurately, and the coupling degree between the copy information and the target video is improved.

BRIEF DESCRIPTION OF DRAWINGS

The preceding and other features, advantages and aspects of the embodiments of the present disclosure will become more apparent with reference to the following specific implementations thereof in conjunction with the drawings. Same or similar reference numerals in the drawings denote same or similar elements. It is to be understood that the drawings are illustrative and that originals and elements are not necessarily drawn to scale.

DETAILED DESCRIPTION

Figure 1:
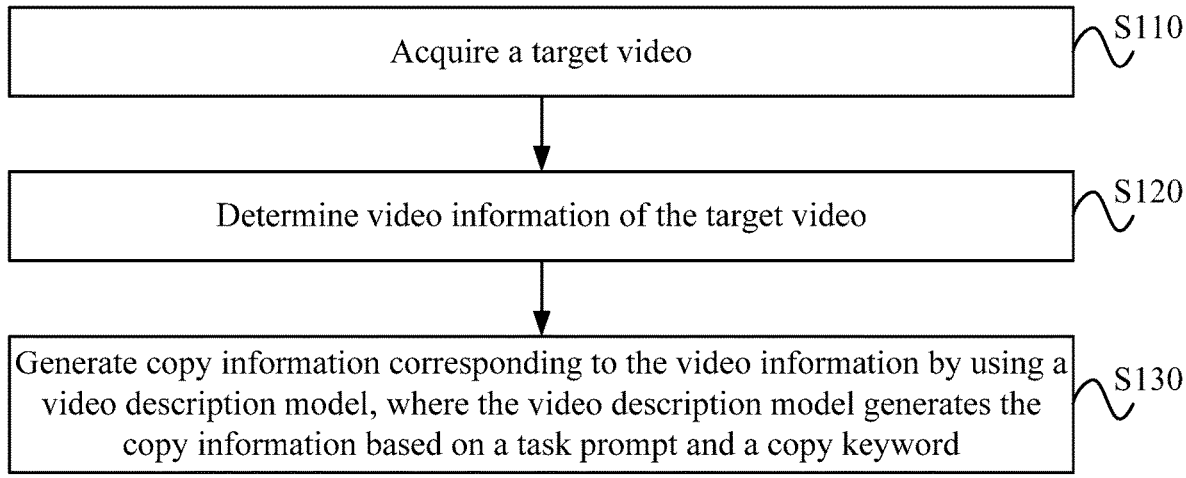
FIG. 1 is a flowchart of a processing method according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and embodiments of the present disclosure are merely illustrative and are not intended to limit the scope of the present disclosure.

It is to be understood that various steps recited in the method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

Optional features and examples are provided in each of the multiple embodiments described below. Multiple features described in the embodiments may be combined to form multiple optional solutions. Each numbered embodiment should not be regarded as only one solution. Additionally, if not in collision, the embodiments in the present disclosure and the features thereof may be combined with each other.

Embodiment One

FIG. 1 is a flowchart of a processing method according to embodiment one of the present disclosure. The method is applicable to the case of processing a video and may be implemented by a processing apparatus. The apparatus may be implemented by software and/or hardware and is generally integrated on an electronic device. In the embodiment, the electronic device includes but is not limited to: a computer, a laptop, a tablet and/or a mobile phone.

As shown in FIG. 1, the processing method provided in embodiment one of the present disclosure includes steps described below.

In S110, a target video is acquired.

The target video may be understood as a to-be-processed video, such as a video to be subjected to copy information determination. The target video may be an original video or a certain video clip in the original video. The original video may refer to a to-be-processed original video, such as a video published by a publisher. The video published by the publisher may be a video that has been shot but not edited or a video that has undergone preliminary processing (such as cropping, adding titles and subtitles, etc.) after shot. A certain video clip in the original video may be a video clip obtained after the chapter division is performed on the original video. Different video clips may be considered as different chapters of the original video, and the technical means for chapter division is not limited here.

In the embodiment, the manner for acquiring the target video is not limited. For example, the processing method may be applied to video presentation application programs; the target video may be a video acquired from a service terminal or a video obtained after multiple videos acquired from the service terminal are filtered, and the filtering means is not limited here.

In S120, video information of the target video is determined.

The video information may refer to information contained in the target video and may include, for example, a title, subtitle information, and/or a frame feature, etc. The title may refer to a title of the original video and may be used for characterizing the main content and the subject matter of the original video. The title may be generated through editing by the publisher.

The subtitle information may refer to a text description added in the target video, may be, for example, commentary text, dialogues and explanatory words, and may be located at a blank area of the target video, such as the bottom area, the right area, etc. In the embodiment, the subtitle information may be obtained by performing character recognition on the target video, or may be obtained by performing speech recognition on the target video, which is not limited in the embodiment. The frame feature may be a visual feature of each frame in the target video, for example, may include a person feature, a color feature, etc.

Specifically, the video information of the target video may be determined. The specific method for determining the video information is not limited in this step, and different video information corresponds to different determination means. For example, the target video may be input into a feature extraction model to generate specific video information of the target video, and the feature extraction model may include a character recognition model, an image recognition model and/or a speech recognition model, etc. For another example, in the present application, audio-video analysis processing may be directly performed on the target video without using a model to obtain the corresponding video information.

In S130, copy information corresponding to the video information is generated by using a video description model, where the video description model generates the copy information based on a task prompt and a copy keyword.

The video description model may be understood as a model for outputting the copy information corresponding to the video information according to the input video information. In the embodiment, the video description model may be pre-trained, and the process of training is not specifically limited here. The copy information may refer to a brief description of the target video, and is used for characterizing the main content of the target video. For example, when the target video is a certain video clip in the original video, the copy information at this time may be chapter information corresponding to the video clip, that is, the description of the video clip; when the target video is the original video, the copy information may be a summary of the main points of the original video, that is, note information of the meaning expressed by the original video.

The task prompt may be considered as a character prompting the type of the generated copy information. The video description model in the present disclosure may be a multitasking model, and the task prompt may constrain tasks processed by the video description model. For example, the task prompt indicates the processing of a chapter task, where the chapter task may include the task of generating the chapter information such as a chapter keyword and chapter description information. For another example, the task prompt indicates the processing of a note task, where the note task may include the task of generating the note information such as a note keyword and note description information. The category of the task included in the task prompt is not limited here, and may be determined according to actual situations.

The copy keyword may be a character which constrains the keyword for generating the copy information and is used for constraining the keyword intended for generating the copy information. The source of the copy keyword is not limited. For example, the copy keyword may be generated by the video description model according to the target video, or the corresponding copy keyword may be determined according to classification information of the target video, etc.

A food video is taken as an example. The task prompt may indicate generating the chapter information of chapters, and the copy keyword may constrain the keyword under the category of tasting or production. Then, the chapter keyword and the chapter description information included in the generated chapter information are information related to tasting or production.

In this step, the copy information corresponding to the video information may be generated by using the video description information, and the generated copy information is constrained by the task prompt, the video information and the copy keyword. Specific steps for generating the copy information are not limited here.

In an embodiment, after the task prompt, the copy keyword and the video information are acquired, the task prompt, the copy keyword and the video information are separately processed into the form of feature vectors for representation, and then the processed feature vectors are input into the video description information to generate the corresponding copy information.

In an embodiment, after the video information and the task prompt are acquired, the video information and the task prompt are separately processed into the form of feature vectors for representation, and then the processed feature vectors are input into the video description information. The video description model analyzes the feature vectors characterizing the video information to obtain the copy keyword, and then generates the corresponding copy information in combination with the copy keyword.

It is to be noted that the acquisition of the task prompt is not limited. The task prompt may be determined through the task selected by a user in a task acquisition interface, or be determined after the analyzation of the target video, or be task prompts corresponding to several groups of default tasks for any target video. The copy information, such as the chapter information and the note information of the target video, corresponding to each task prompt is generated. The order of generating the chapter information and the note information is not limited, for example, the chapter information and the determination of the note information may be generated synchronously.

According to the processing method provided by embodiment one of the present disclosure, a target video is acquired; video information of the target video is determined; copy information corresponding to the video information is generated by using a video description model, where the video description model generates the copy information based on a task prompt and a copy keyword. Through the preceding method, the video description model is constrained based on the task prompt and the copy keyword, so that the copy information of the target video is generated more accurately, and the coupling degree between the copy information and the target video is improved.

On the basis of the preceding embodiment, variant embodiments of the preceding embodiment are proposed, and it is to be noted that here, for the brevity of description, only differences from the preceding embodiment are described in the variant embodiments.

In an embodiment, the target video includes an original video. The copy information includes note information corresponding to the original video, where the note information is a summary of main points in the original video.

In the embodiment, the target video may be an original video, and then the video information may be determined based on the original video, such as based on a title of the original video, a frame feature of each frame in the original video and subtitle information of the entire original video. At this time, the copy information may include the note information corresponding to the original video, where the note information may be understood as a summary of main points in the original video. For example, when the original video is a food production video, the copy information may include the dish name, the type of food materials to be prepared, the description of production steps, the description of matters needing attention, etc.

The note information may be determined by analyzing the video information, and when determined, is constrained by the task prompt and the copy keyword.

In an embodiment, the video information includes a title of the original video, a frame feature of each frame in the original video and subtitle information of the original video, and the task prompt indicates a note keyword and note description information for generating the note information.

In the embodiment, the note information includes the note keyword and the note description information. The note keyword may be understood as a keyword in notes. The note description information may be a description of the main points in the target video. The note description information may be independent information or information corresponding to the note keyword.

Exemplarily, the note keyword may be dish name, and correspondingly, the note description information is braised pork.

When the task prompt indicates generating the note information, the target video may be the original video, and the copy information may be the note information.

In an embodiment, the target video includes: at least one video clip in the original video, and the copy information includes chapter information of the at least one video clip, where the chapter information is a description of the at least one video clip.

It may be understood that in some scenes (such as food and installation videos), the original video may be divided into multiple video clips, then the target video may be at least one video clip in the original video. At this time, the video information, such as a title of the original video, a frame feature of each frame in the video clip and subtitle information of the video clip, may be determined based on the target video and the original video, and the copy information may include chapter information of the video clip, where the chapter information may be understood as the description of the video clip.

For example, when the original video is a food production video divided into three video clips, at this time, each video clip corresponds to one piece of copy information, and each piece of copy information is the chapter information corresponding to each video clip. For example, the copy information corresponding to the first video clip may refer to finished product display, the copy information corresponding to the second video clip may refer to food material preparation, and the copy information corresponding to the third video clip may refer to production steps.

In an embodiment, the video information includes a title of the original video, a frame feature of each frame in the at least one video clip and subtitle information of the at least one video clip, and the task prompt indicates a chapter keyword and chapter description information for generating the chapter information.

When the target video is at least one video clip in the original video, the task prompt may indicate a chapter keyword and chapter description information for generating the chapter information. The chapter keyword may be understood as the keyword of a chapter, and the chapter description information may be understood as a description of a target video chapter. The chapter description information may be independent information or information corresponding to the chapter keyword.

Exemplarily, the chapter keyword may be finished product display and the corresponding chapter description information may be braised pork.

Exemplarily, when the target video is two video clips of the original video, the corresponding copy information for the two video clips may be determined sequentially in the present disclosure.

When the task prompt indicates generating the note information, the target video may be the original video, and the copy information may be the note information. When the task prompt indicates generating the chapter information, the target video may be a video clip, and the copy information may be the chapter information.

Embodiment Two

Figure 2:
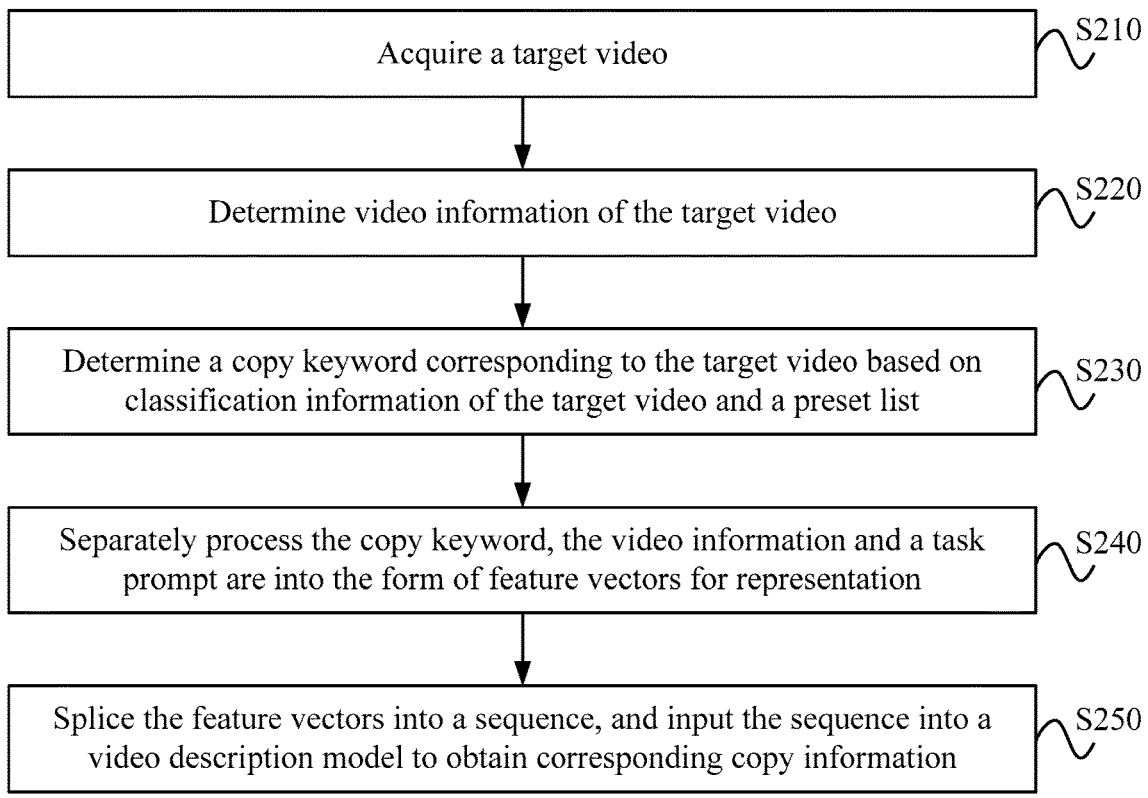
FIG. 2 is a flowchart of a processing method according to embodiment two of the present disclosure.

FIG. 2 is a flowchart of a processing method according to embodiment two of the present disclosure. Embodiment two is specified based on the optional solutions in the preceding embodiments. In the embodiment, the step in which the copy information corresponding to the video information is generated by using the video description model is further specified as follows. The copy keyword corresponding to the target video is determined based on classification information of the target video and a preset list; the copy keyword, the video information and the task prompt are separately processed into the form of feature vectors for representation; and the feature vectors are spliced into a sequence, and the sequence is input into the video description model to obtain the corresponding copy information.

For the content not detailed in the embodiment, reference may be made to embodiment one.

As shown in FIG. 2, the processing method provided in embodiment two of the present disclosure includes steps described below.

In S210, a target video is acquired.

In S220, video information of the target video is determined.

In S230, a copy keyword corresponding to the target video is determined based on classification information of the target video and a preset list.

The classification information may be used for characterizing the category of the target video, and may be, for example, a food category, a tour category, etc. The method for determining the classification information is not limited here. The classification information may be determined by analyzing the target video, or may be determined after attribute information of the target video is directly acquired. The attribute information may be defined when the publisher produces the video.

The preset list may refer to a list of copy keywords preset for each category of video. For example, when the target video is a video of the food category, the preset list may include copy keywords such as tasting, food material and production step; when the target video is a tour video, the preset list may include copy keywords such as location, route and scene, which is not limited in the embodiment.

In this step, the copy keyword corresponding to the target video may be first determined based on the classification information of the target video and the preset list, and then copy information is subsequently determined according to the copy keyword.

In S240, the copy keyword, the video information and a task prompt are separately processed into the form of feature vectors for representation.

After the copy keyword, the video information and the task prompt of the target video are obtained, the copy keyword, the video information and the task prompt of the target video may be separately processed into the form of feature vectors to facilitate the subsequent input into a model. The manner for processing the copy keyword, the video information, and the task prompt of the target video into feature vectors is not limited, for example, the copy keyword, the task prompt and text information in the video information such as a title and subtitle information may be divided in units of words, and then each word is processed into the form of a feature vector by using a word vector. The frame feature in the video information takes frames as units, and a frame is processed into a feature vector by using a convolutional neural network.

In S250, the feature vectors are spliced into a sequence, and the sequence is input into a video description model to obtain corresponding copy information.

In the embodiment, the processed feature vectors may be spliced into a sequence, and then the spliced sequence is input into the video description model to obtain the copy information. The steps for obtaining the copy information are not limited and are not expanded on, as long as the copy information can be obtained.

According to the processing method provided by embodiment two of the present disclosure, a target video is acquired, video information of the target video is determined, a copy keyword corresponding to the target video is determined based on classification information of the target video and a preset list; the copy keyword, the video information and a task prompt are separately processed into the form of feature vectors for representation; and the feature vectors are spliced into a sequence, and the sequence is input into a video description model to obtain corresponding copy information Through the method, the copy keyword of the target video is determined based on the classification information of the target video and the preset list, so that the copy keyword is closer to the classification information of the target video, and thus the obtained copy information is more accurate.

In an embodiment, the step in which the copy information corresponding to the video information is generated by using the video description model includes steps described below.

The video information and the task prompt are separately processed into the form of feature vectors for representation.

The feature vectors are spliced into a sequence, and the sequence is input into the video description model to obtain the corresponding copy information, where the video description model determines the corresponding copy keyword based on the target video.

In the embodiment, the copy keyword may also be determined based on the video description model. Exemplarily, when the feature vectors corresponding to the video information of the target video and the task prompt are input into the video description model, the video description model may determine the copy keyword of the target video while recognizing the feature vectors; and after the video description model processes the copy keyword into a feature vector, the feature vector is used in combination with the feature vectors corresponding to the video information and the task prompt for determining the copy information by the video description model.

In the embodiment, the manner for processing the above information such as the copy keyword, the video information and the task prompt into the feature vectors may be based on the preceding embodiment and is not limited here.

The processing method provided by the embodiment of the present disclosure is illustratively described below.

First, a video clip (that is, the target video) in the original video may be acquired, and then a video description module (that is, the video description model) may use context information of the current video clip to generate a piece of copy, that is, the copy information. The context information may include a task prompt, a video frame feature, a video title, video subtitles and a keyword.

The task prompt represents the type of the copy to be generated. For example, the task prompt indicates a description of a certain chapter of the video, or indicates a summary of some main point information in the entire video, etc.

The video frame feature may refer to visual features (that is, the frame feature of each frame) extracted from different frames of a video clip.

The video title may refer to a title gave to a video by the video publisher, that is, the title of the original video.

The video subtitles include a line part of persons in a video and a text title part (that is, subtitle information of a video clip) appearing in a video screen, and may be acquired by performing character recognition on the video screen or performing speech recognition on the video.

The keyword, that is, the copy key keyword, may be the prompt to the video description model for controlling the topic of the text generated by the video description model.

In the context information, for the video frame feature, frames may be taken as units, and a frame is processed into a feature vector by using a convolution neural network; for the text information such as the task prompt, the video title, the video subtitles and the keyword, words may be taken as units, and each word is processed into a feature vector (that is, each word is separately processed into the form of a feature vector for representation) by using a word vector.

Finally, all the feature vectors are spliced into a sequence and input to a Transformer model (that is, the video description model), and the Transformer model gradually generates each word in the copy to form the copy information.

Figure 3:
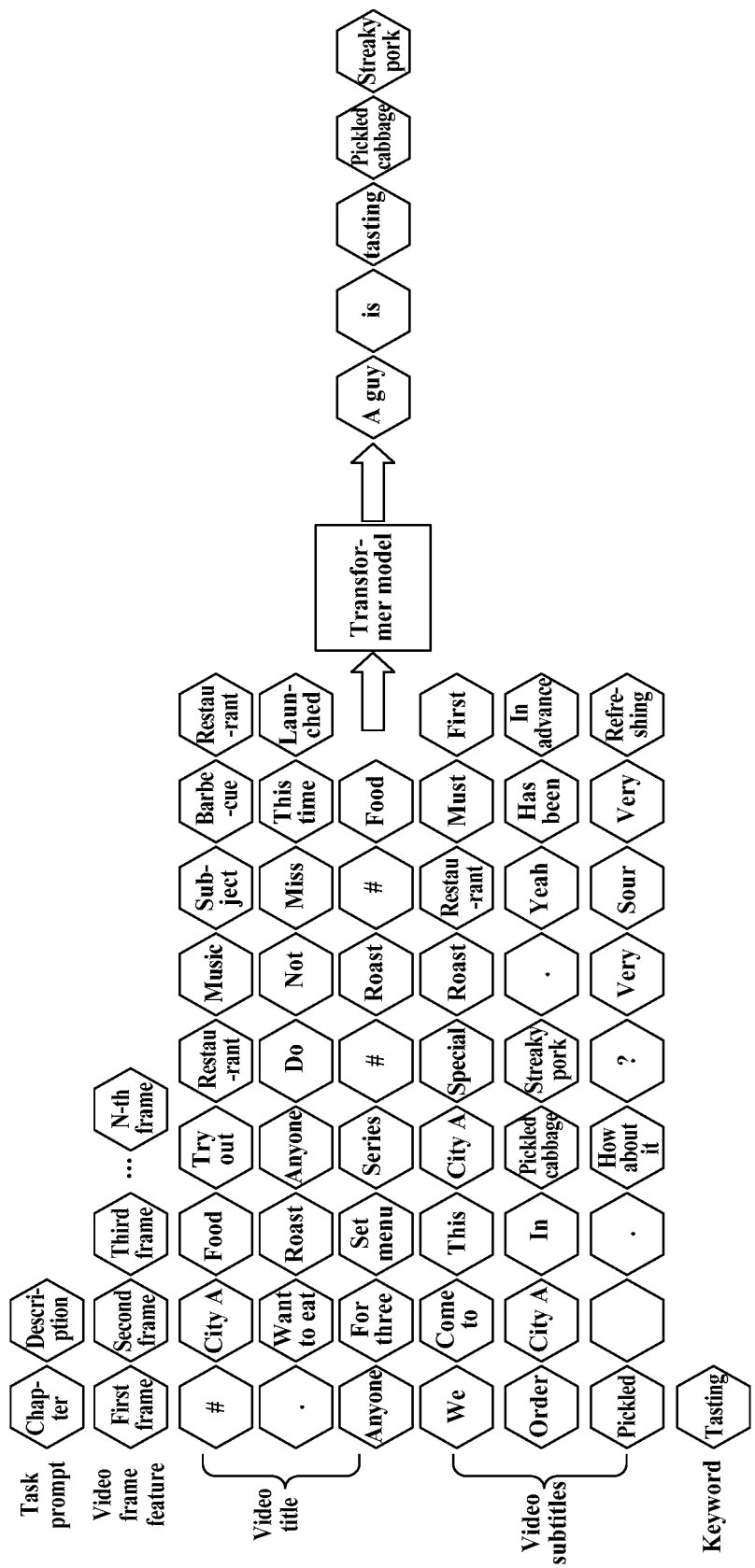
FIG. 3 is a diagram showing a scene of determining copy information according to embodiment two of the present disclosure.

Exemplarily, FIG. 3 is a diagram showing a scene of determining copy information according to embodiment two of the present disclosure. As shown in FIG. 3, the task prompt is chapter and description and includes the chapter description information, and chapter and description are each represented in the form of feature vectors; the video frame feature is a frame feature of each frame in a video clip, and is separately represented in the form of a feature vector; each word of the video title (that is, the title of the original video) and the video subtitles (that is, the subtitle information of the original video, or the subtitle information of the video clip) is separately processed into a feature vector; the keyword "tasting" may be obtained from the classification information (that is, the food category) of the video clip and the preset list. After the preceding feature vectors are spliced into a sequence and input into the Transformer model (that is, the video description model), the copy information "a guy is tasting pickled cabbage with streaky pork" corresponding to the video clip is obtained. The keyword, that is, the copy keyword, is used for constraining the generated copy information to be related to tasting. The task prompt is used for constraining the copy information for generating the chapter description information.

Figure 4:
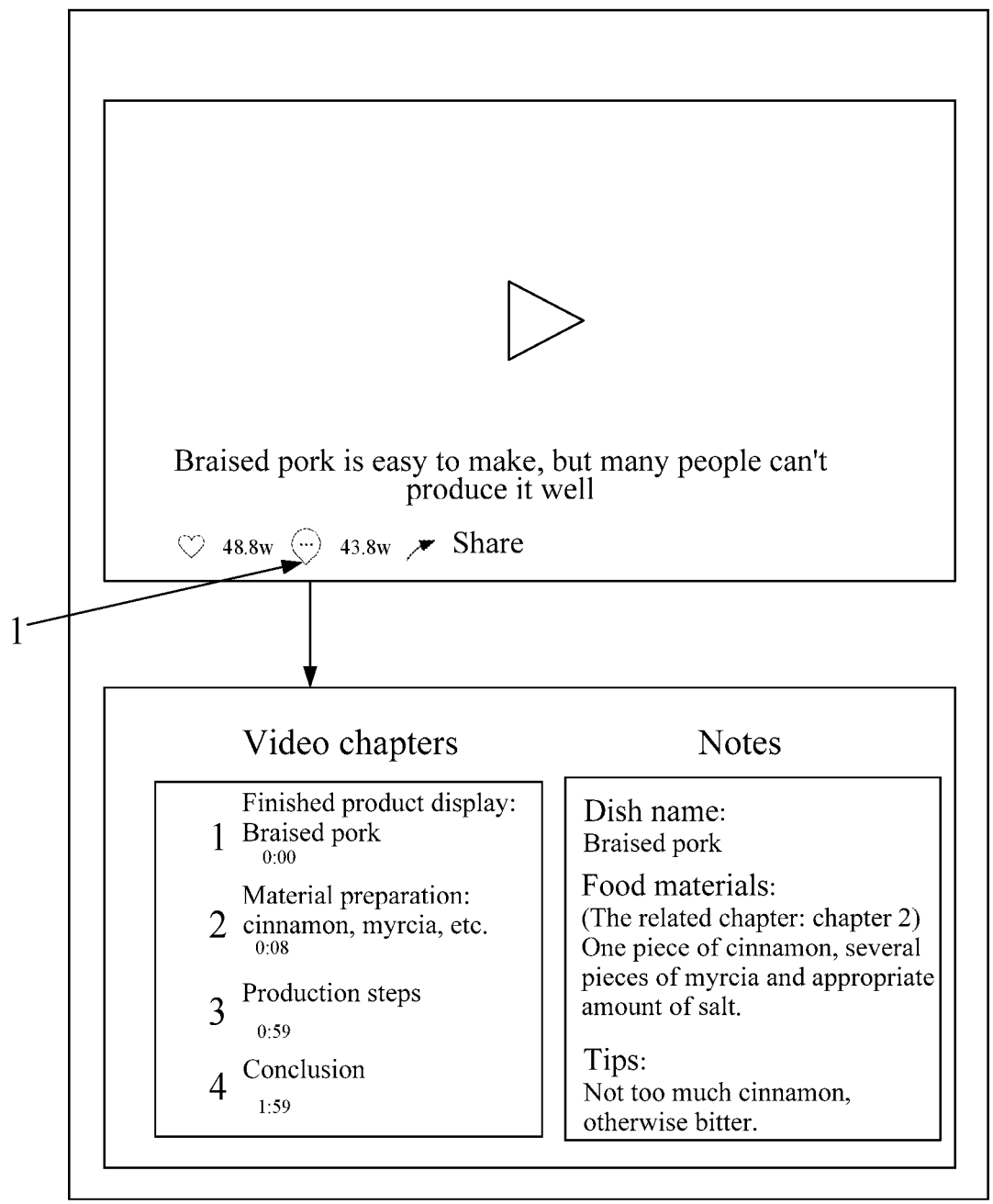
FIG. 4 is a diagram showing a scene of a processing method according to embodiment two of the present disclosure.

FIG. 4 is a diagram showing a scene of a processing method according to embodiment two of the present disclosure. As shown in FIG. 4, the original video is an explanation video for making braised pork. Through the processing method provided in the embodiment, the chapter information of each video clip in the original video and the note information corresponding to the original video can be obtained based on the video information of the target video. The chapter information of each video clip is a description of the corresponding video clip, including the chapter keyword and the chapter description information, and the note information is a summary of main points in the original video, including the note keyword and the note description information.

FIG. 4 includes four chapters, and chapter keywords of the four chapters are finished product display, food material preparation, production steps and conclusion, respectively. The chapter description information is braised pork corresponding to finished product display, cinnamon, myrcia, etc. corresponding to food material preparation, etc., respectively. The chapter description information shown here is not in one-to-one correspondence with the chapter keywords. For example, no corresponding chapter description information exists at the conclusion of a chapter keyword. The correlation between the chapter description information and the chapter keywords is determined based on the actual situations of the original video, and is not limited here.

The note information included in FIG. 4 includes the note keywords including dish name, food materials and tips. The note description information is braised pork corresponding to dish name, one piece of cinnamon, several pieces of myrcia and appropriate amount of salt corresponding to food materials (the related chapter: chapter 2), and not too much cinnamon, otherwise bitter corresponding to tips, respectively.

The preceding chapter information of each video clip and the note information corresponding to the original video may be presented by triggering a comment control 1, and the presentation may be achieved in the form of an image or in the form of text, etc. In FIG. 4, video chapters correspond to the chapter information, and notes correspond to the note information.

Embodiment Three

Figure 5:
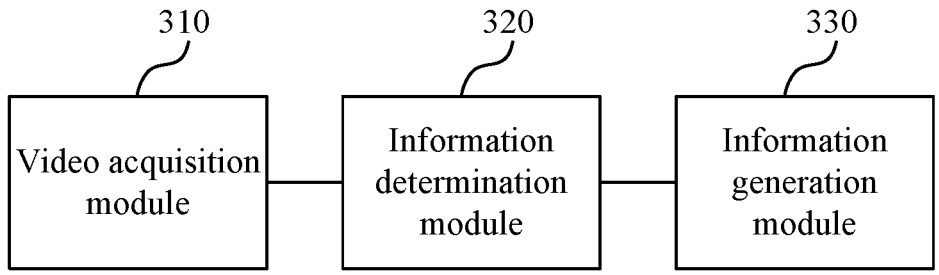
FIG. 5 is a structural diagram of a processing apparatus according to embodiment three of the present disclosure.

FIG. 5 is a structural diagram of a processing apparatus according to embodiment three of the present disclosure. The apparatus is applicable to the case of processing a video. The apparatus may be implemented by software and/or hardware and is generally integrated on an electronic device.

As shown in FIG. 5, the apparatus includes a video acquisition module 310, an information determination module 320, and an information generation module 330.

The video acquisition module 310 is configured to acquire a target video.

The information determination module 320 is configured to determine video information of the target video.

The information generation module 330 is configured to generate copy information corresponding to the video information by using a video description model, where the video description model generates the copy information based on a task prompt and a copy keyword.

In the embodiment, the apparatus acquires a target video through the video acquisition module 310, determines video information of the target video through the information determination module 320, and generates copy information corresponding to the video information by using a video description model through the information generation module 330, where the video description model generates the copy information based on a task prompt and a copy keyword. Through the apparatus, the video description model is constrained based on the task prompt and the copy keyword, so that the copy information of the target video is generated and determined more accurately, and thus the correctness of the video processing the copy information and the coupling degree between the copy information and the target video are improved.

Further, the target video includes: an original video, and the copy information includes note information corresponding to the original video, where the note information is a summary of main points in the original video.

Further, the video information includes a title of the original video, a frame feature of each frame in the original video and subtitle information of the original video, and the task prompt indicates a note keyword and note description information for generating the note information.

Further, the target video includes: at least one video clip in the original video, and the copy information includes chapter information of the at least one video clip, where the chapter information is a description of the at least one video clip.

Further, the video information includes a title of the original video, a frame feature of each frame in the at least one video clip and subtitle information of the at least one video clip, and the task prompt indicates a chapter keyword and chapter description information for generating the chapter information.

Further, the information generation module 330 executes steps described below.

The copy keyword corresponding to the target video is determined based on classification information of the target video and a preset list.

The copy keyword, the video information and the task prompt are separately processed into a form of feature vectors for representation.

The feature vectors are spliced into a sequence, and the sequence is input into the video description model to obtain the corresponding copy information.

Further, the information generation module 330 executes steps described below.

The video information and the task prompt are separately processed into a form of feature vectors for representation.

The feature vectors are spliced into a sequence, and the sequence is input into the video description model to obtain the corresponding copy information, where the video description model determines the corresponding copy keyword based on the target video.

The preceding processing apparatus may execute the processing method provided by any embodiment of the present disclosure, and has functional modules and beneficial effects corresponding to the executed method.

Embodiment Four

Figure 6:
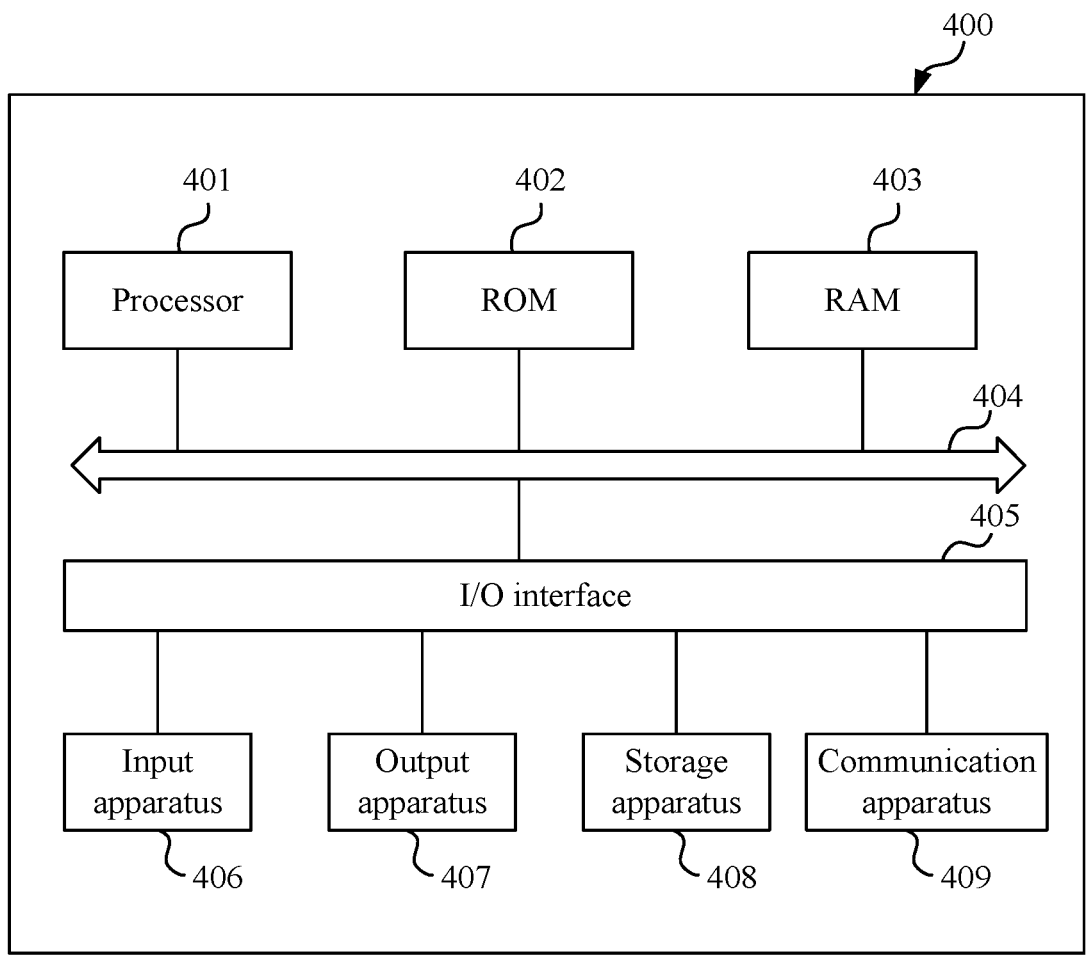
FIG. 6 is a structural diagram of an electronic device according to embodiment four of the present disclosure.

FIG. 6 is a structural diagram of an electronic device according to embodiment four of the present disclosure. FIG. 6 shows the structure diagram of the electronic device 400 for implementing an embodiment of the present disclosure. The electronic device 400 in the embodiment of the present disclosure may include, but is not limited to, mobile terminals such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), and fixed terminals such as a digital television (TV) and a desktop computer. The electronic device 400 shown in FIG. 6 is merely an example and is not intended to limit the function and usage scope of the embodiments of the present disclosure.

As shown in FIG. 6, the electronic device 400 may include one or more processors (such as a central processing unit and a graphics processing unit) 401. The processors 401 may execute various appropriate actions and processing according to a program stored in a read-only memory (ROM) 402 or a program loaded into a random-access memory (RAM) 403 from a storage apparatus 408. The one or more processors 401 implement the processing method provided by the present disclosure. Various programs and data required for the operation of the electronic device 400 are also stored in the RAM 403. The processors 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touch pad, a keyboard, a mouse, a camera, a microphone, an accelerometer and a gyroscope; an output apparatus 407 such as a liquid crystal display (LCD), a speaker and a vibrator; the storage apparatus 408, configured to store one or more programs, such as a magnetic tape and a hard disk; and a communication apparatus 409. The communication apparatus 409 may allow the electronic device 400 to perform wireless or wired communication with other devices so as to exchange data. Although FIG. 6 shows the electronic device 400 having various apparatuses, it is to be understood that not all of the apparatuses shown here need to be implemented or present. Alternatively, more or fewer apparatuses may be implemented or present.

Particularly, according to the embodiments of the present disclosure, the process described above with reference to the flowcharts may be implemented as a computer software program. For example, the embodiment of the present disclosure includes a computer program product. The computer program product includes a computer program carried in a computer-readable medium. The computer program includes program codes for executing the method shown in the flowcharts. In such an embodiment, the computer program may be downloaded from a network and installed through the communication apparatus 409, or may be installed from the storage apparatus 408, or may be installed from the ROM 402. When the computer program is executed by the processors 401, the preceding functions defined in the method of the embodiments of the present disclosure are executed.

It is to be noted that the preceding computer-readable medium in the present disclosure may be a computer-readable signal medium or a computer-readable storage medium or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to, an electrical connection having one or more wires, a portable computer magnetic disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any network protocol currently known or to be developed in the future, such as the Hypertext Transfer Protocol (HTTP), and may be interconnected with digital data communication (for example, a communication network) in any form or medium. Examples of the communication network include a local area network (LAN), a wide area network (WAN), an internet (such as the Internet) and a peer-to-peer network (such as an Ad-Hoc network), as well as any network currently known or to be developed in the future.

The preceding computer-readable medium may be included in the preceding electronic device 400 or may exist alone without being assembled into the electronic device 400.

The preceding computer-readable medium stores one or more computer programs which, when executed by a processor, execute the method described below.

A target video is acquired.

Video information of the target video is determined.

Copy information corresponding to the video information is generated by using a video description model, where the video description model generates the copy information based on a task prompt and a copy keyword.

The preceding computer-readable medium carries one or more programs. When the preceding one or more programs are executed by the electronic device, for the electronic device 400, computer program codes for executing the operations of the present disclosure may be written in one or more programming languages or a combination thereof, the programming languages including object-oriented programming languages such as Java, Smalltalk and C++ and further including conventional procedural programming languages such as C programming language or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or may be connected to an external computer (for example, via the Internet provided by an Internet service provider).

The flowcharts and block diagrams in the drawings show the possible architecture, function and operation of the system, method and computer program product according to various embodiments of the present disclosure. Each block in the flowcharts or block diagrams may represent a module, a program segment or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The described modules involved in the embodiments of the present disclosure may be implemented in software or in hardware. The name of a module is not intended to limit the module in a certain circumstance.

The functions described above herein may be executed, at least partially, by one or more hardware logic components. For example, without limitations, exemplary types of hardware logic components that may be used include a field programmable gate array (FPGA), an application-specific integrated circuit (ASIC), an application specific standard product (ASSP), a system on a chip (SoC), and a complex programmable logic device (CPLD).

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to one or more embodiments of the present disclosure, example 1 provides a processing method including steps described below.

A target video is acquired.

Video information of the target video is determined.

Copy information corresponding to the video information is generated by using a video description model, where the video description model generates the copy information based on a task prompt and a copy keyword.

According to one or more embodiments of the present disclosure, in example 2, according to the method in example 1, the target video includes: an original video, and the copy information includes note information corresponding to the original video, where the note information is a summary of main points in the original video.

According to one or more embodiments of the present disclosure, in example 3, according to the method in example 2, the video information includes a title of the original video, a frame feature of each frame in the original video and subtitle information of the original video, and the task prompt indicates a note keyword and note description information for generating the note information.

According to one or more embodiments of the present disclosure, in example 4, according to the method in example 1, the target video includes: at least one video clip in the original video, and the copy information includes chapter information of the at least one video clip, where the chapter information is a description of the at least one video clip.

According to one or more embodiments of the present disclosure, in example 5, according to the method in example 4, the video information includes a title of the original video, a frame feature of each frame in the at least one video clip and subtitle information of the at least one video clip, and the task prompt indicates a chapter keyword and chapter description information for generating the chapter information.

According to one or more embodiments of the present disclosure, in example 6, according to the method of example 1, the step in which the copy information corresponding to the video information is generated by using the video description model includes steps described below.

The copy keyword corresponding to the target video is determined based on classification information of the target video and a preset list.

The copy keyword, the video information and the task prompt are separately processed into a form of feature vectors for representation.

The feature vectors are spliced into a sequence, and the sequence is input into the video description model to obtain the corresponding copy information.

According to one or more embodiments of the present disclosure, in example 7, according to the method of example 1, the step in which the copy information corresponding to the video information is generated by using the video description model includes steps described below.

The video information and the task prompt are separately processed into a form of feature vectors for representation.

The feature vectors are spliced into a sequence, and the sequence is input into the video description model to obtain the corresponding copy information, where the video description model determines the corresponding copy keyword based on the target video.

According to one or more embodiments of the present disclosure, example 8 provides a processing apparatus. The processing apparatus includes a video acquisition module, an information determination module and an information generation module.

The video acquisition module is configured to acquire a target video.

The information determination module is configured to determine video information of the target video.

The information generation module is configured to generate copy information corresponding to the video information by using a video description model, where the video description model generates the copy information based on a task prompt and a copy keyword.

According to one or more embodiments of the present disclosure, example 9 provides an electronic device. The electronic device includes one or more processors and a storage apparatus configured to store one or more programs.

The one or more programs, when executed by the one or more processors, cause the one or more processors to implement the method according to any one of example 1 to example 7.

According to one or more embodiments of the present disclosure, example 10 provides a computer-readable medium storing a computer program. The program, when executed by a processor, implements the method according to any one of example 1 to example 7.

The preceding description is merely illustrative of preferred embodiments of the present disclosure and the technical principles used therein. Those skilled in the art should understand that the scope referred to in the present disclosure is not limited to the technical solutions formed by the particular combination of the preceding technical features, but intended to cover other technical solutions which may be formed by any combination of the preceding technical features or their equivalents without departing from the concept of the disclosure, for example, technical solutions formed by mutual substitutions of the preceding features and the technical features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable subcombination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A processing method, comprising:
    acquiring a target video;
    determining video information of the target video; and
    generating copy information corresponding to the video information by using a video description model, wherein the copy information is a brief description of the target video and is generated by using the video description model and based on a task prompt and a copy keyword;
    wherein generating the copy information corresponding to the video information by using the video description model comprises:
        determining the copy keyword corresponding to the target video based on classification information and a preset list of the target video;
        dividing, in units of words, the copy keyword, the task prompt and text information in the video information into words, and processing the words into first feature vectors by using a word vector;

dividing, in units of frames, frame features in the video information into frames, and processing the frames into second feature vectors by using a convolutional neural network; and splicing the feature vectors into a sequence, and inputting the sequence into the video description model to obtain the copy information;

wherein the video description model is a multitasking model with a plurality of tasks, the copy keyword is a character constraining a keyword for generating the copy information of the target video, and the task prompt is a character constraining the plurality of tasks.

2. The method according to claim 1, wherein the target video comprises an original video; and the copy information comprises note information corresponding to the original video, wherein the note information is a summary of main points in the original video.

3. The method according to claim 2, wherein the video information comprises a title of the original video, a frame feature of each frame in the original video and subtitle information of the original video, and a note keyword and note description information of the note information which are generated by using an indication of the task prompt.

4. The method according to claim 1, wherein the target video comprises a video clip in the original video; and the copy information comprises chapter information of the video clip, wherein the chapter information is a description of the video clip.

5. The method according to claim 4, wherein the video information comprises a title of the original video, a frame feature of each frame in the video clip and subtitle information of the video clip, and a chapter keyword and chapter description information of the chapter information which are generated by using an indication of the task prompt.

6. An electronic device, comprising:

one or more processors; and a storage apparatus configured to store one or more programs;

wherein the one or more programs, when executed by the one or more processors, cause the one or more processors to implement:

acquiring a target video;

determining video information of the target video; and generating copy information corresponding to the video information by using a video description model, wherein the copy information is a brief description of the target video and is generated by using the video description model and based on a task prompt and a copy keyword;

wherein the one or more processors generate the copy information corresponding to the video information by using the video description model by:

determining the copy keyword corresponding to the target video based on classification information and a preset list of the target video;

dividing, in units of words, the copy keyword, the task prompt and text information in the video information into words, and processing the words into first feature vectors by using a word vector;

dividing, in units of frames, frame features in the video information into frames, and processing the frames into second feature vectors by using a convolutional neural network; and splicing the feature vectors into a sequence, and inputting the sequence into the video description model to obtain the copy information;

wherein the video description model is a multitasking model with a plurality of tasks, the copy keyword is a character constraining a keyword for generating the copy information of the target video, and the task prompt is a character constraining the plurality of tasks.

7. The electronic device according to claim 6, wherein the target video comprises an original video; and the copy information comprises note information corresponding to the original video, wherein the note information is a summary of main points in the original video.

8. The electronic device according to claim 7, wherein the video information comprises a title of the original video, a frame feature of each frame in the original video and subtitle information of the original video, and a note keyword and note description information of the note information which are generated by using an indication of the task prompt.

9. The electronic device according to claim 6, wherein the target video comprises a video clip in the original video; and the copy information comprises chapter information of the video clip, wherein the chapter information is a description of the video clip.

10. The electronic device according to claim 9, wherein the video information comprises a title of the original video, a frame feature of each frame in the video clip and subtitle information of the video clip, and a chapter keyword and chapter description information of the chapter information which are generated by using an indication of the task prompt.

11. A non-transitory computer-readable storage medium storing a computer program which, when executed by a processor, implements:

acquiring a target video;

determining video information of the target video; and generating copy information corresponding to the video information by using a video description model, wherein the copy information is a brief description of the target video and is generated by using the video description model and based on a task prompt and a copy keyword;

wherein the processor generates the copy information corresponding to the video information by using the video description model by:

determining the copy keyword corresponding to the target video based on classification information and a preset list of the target video;

dividing, in units of words, the copy keyword, the task prompt and text information in the video information into words, and processing the words into first feature vectors by using a word vector;

dividing, in units of frames, frame features in the video information into frames, and processing the frames into second feature vectors by using a convolutional neural network; and splicing the feature vectors into a sequence, and inputting the sequence into the video description model to obtain the copy information;

wherein the video description model is a multitasking model with a plurality of tasks, the copy keyword is a character constraining a keyword for generating the copy information of the target video, and the task prompt is a character constraining the plurality of tasks.

12. The non-transitory computer-readable storage medium according to claim 11, wherein
the target video comprises an original video; and
the copy information comprises note information corresponding to the original video, wherein the note information is a summary of main points in the original video.

13. The non-transitory computer-readable storage medium according to claim 12, wherein the video information comprises a title of the original video, a frame feature of each frame in the original video and subtitle information of the original video, and a note keyword and note description information of the note information which are generated by using an indication of the task prompt.

14. A processing method, comprising:
acquiring a target video;
determining video information of the target video; and
generating copy information corresponding to the video information by using a video description model, wherein the copy information is a brief description of the target video and is generated by using the video description model and based on a task prompt and a copy keyword;
wherein generating the copy information corresponding to the video information by using the video description model comprises:
determining the copy keyword corresponding to the target video by using the video description model and based on the target video;
dividing, in units of words, the copy keyword, the task prompt and text information in the video information into words, and processing the words into first feature vectors by using a word vector;
dividing, in units of frames, frame features in the video information into frames, and processing the frames into second feature vectors by using a convolutional neural network; and
splicing the feature vectors into a sequence, and inputting the sequence into the video description model to obtain the copy information;
wherein the video description model is a multitasking model with a plurality of tasks, the copy keyword is a character constraining a keyword for generating the copy information of the target video, and the task prompt is a character constraining the plurality of tasks.

15. The method according to claim 14, wherein
the target video comprises an original video; and
the copy information comprises note information corresponding to the original video, wherein the note information is a summary of main points in the original video.

16. The method according to claim 15, wherein the video information comprises a title of the original video, a frame feature of each frame in the original video and subtitle information of the original video, and a note keyword and note description information of the note information which are generated by using an indication of the task prompt.

17. The method according to claim 14, wherein
the target video comprises a video clip in the original video; and
the copy information comprises chapter information of the video clip, wherein the chapter information is a description of the video clip.

18. The method according to claim 17, wherein the video information comprises a title of the original video, a frame feature of each frame in the video clip and subtitle information of the video clip, and a chapter keyword and chapter description information of the chapter information which are generated by using an indication of the task prompt.

19. An electronic device, comprising:
one or more processors; and
a storage apparatus configured to store one or more programs;
wherein the one or more programs, when executed by the one or more processors, cause the one or more processors to implement the method according to claim 14.

20. A non-transitory computer-readable storage medium storing a computer program which, when executed by a processor, implements the method according to claim 14.

* * * * *